Patented July 22, 1924.

1,502,222

UNITED STATES PATENT OFFICE.

KARL HEINRICH WIMMER, OF BREMEN, GERMANY, ASSIGNOR TO COFFEE PRODUCTS CORPORATION, OF NEW YORK, N. Y.

PROCESS FOR PREPARING CAFFEINE-FREE COFFEE BEANS.

No Drawing.  Application field October 30, 1923. Serial No. 671,757.

*To all whom it may concern:*

Be it known that I, Dr. KARL HEINRICH WIMMER, residing at Bremen, Germany, have invented certain new and useful Improvements in a Process for Preparing Caffeine-Free Coffee Beans, of which the following is a specification.

The methods hitherto in use for the extraction of the caffeine out of coffee and the like have various drawbacks. The principal objection is that the extraction is often detrimental to the coffee.

It has now been found, that when extracting caffeine, two factors must be borne in mind which are of extreme importance with respect to the good quality of the caffeine-free coffee and particularly with regard to the quality of the caffeine dissolved by the extracting agent. These factors are in the first place: the liquid, the quantity of which may somewhat vary within narrow limits, serving the so-called opening of the coffee and in the second place; the nature of the extracting agent which is employed.

As regards the latter particularly the boiling point and the solvent capacities are of very great importance.

The process according to the invention now exists in using extracting agents, which are liquids having a boiling point lower than 45° C.

It has appeared that in this manner especially good results may be obtained, which is very surprising as one was hitherto of the opinion, that at higher temperatures better results could be obtained than at lower ones. By experiments, however, it has been ascertained that certain ethereal oils and odoriferous resins, contained in the coffee, by application of extracting agents, having a boiling point above 45° C. are transferred in the caffeine-solution and that the lower the boiling point of the extracting agent the less this will be the case.

The advantages obtained by applying the process according to the invention are the following:

(1) The avoidance of a high temperature during the extraction, by which the removing of precious substances is prevented;

(2) A small consumption of heat while extracting;

(3) The particular purity of the extracted caffeine;

(4) (And this is of particular importance) the easy manner to remove the low boiling extracting agent from the coffee-beans.

(5) An extremely good quality of the product.

With the extracting agents hitherto used (benzol, petrol, acetylene chlorides and the like) an extremely long time and thoroughly heated steam were necessary to entirely remove the extracting agents, by which a thorough soaking and losses in aromatic coffee oils could not be avoided.

According to the present invention one obtains the advantage mentioned in a high degree by applying as extracting agent methylenechloride, $CH_2Cl_2$. This substance is a well defined compound, having a boiling point of about 40° C. and a specific gravity of about 1.31 and is uninflammable.

Finally it is of importance according to the invention that before extraction, the coffee is submitted to an opening process, by which it obtains a percentage of water of not less than 18% and not more than 30%.

The following example may give an idea of one of the possibilities of applying the process according to the invention.

The coffee to be treated is in such a way uniformly soaked in an extraction apparatus with steam, eventually with water, that the percentage of water, depending on the kind of the coffee to be treated, amounts to about 18–30%.

Thereafter the coffee is extracted with $CH_2Cl_2$, until a sample taken therefrom shows the absence of caffeine.

Thereupon the extracting agent is removed and the coffee by a suitable steam treatment, while heated, freed from the still remaining extracting agent.

It was proposed heretofore, in addition to the use of high boiling point solvents, to employ ordinary ether (diethyl ether) but this material, although it has a low boiling point and is a good solvent for oils, is unsuitable for the purpose because caffeine is substantially insoluble therein. Obviously ether has not come into use in the art, for this latter reason.

I claim:

1. A process of preparing caffeine-free coffee which comprises extracting the caffeine from coffee with a normally liquid halogenated hydrocarbon derivative having a boiling point lower than 45° C.

2. A process which comprises extracting caffeine from coffee with dichlormethane.

3. A process of removing caffeine from coffee, consisting in submitting the coffee, before the extraction to an opening treatment with liquid water, by which the coffee takes up water in amount not less than 18% and not more than 30%, and then extracting with a normally liquid chlorinated methane having a boiling point below 45° C.

4. A process of removing caffeine from coffee, consisting in submitting the coffee, before the extraction, to an opening treatment with liquid water, by which the coffee takes up water in amount less than 18% and not more than 30%, and then extracting with a liquid in which caffeine is freely soluble, and of which the boiling point is below 45° C.

In testimony whereof I affix my signature.

KARL HEINRICH WIMMER.

Witnesses:
   FRANCIS J. DUGAN,
   F. E. RHAN.